United States Patent [19]

Young

[11] Patent Number: 4,854,070

[45] Date of Patent: Aug. 8, 1989

[54] SURE SET HOOK

[76] Inventor: Gary M. Young, 1991 Sturgeon Bay Tr., Levering, Mich. 49755

[21] Appl. No.: 267,942

[22] Filed: Nov. 7, 1988

[51] Int. Cl.⁴ .................... A01K 83/00; A01K 83/02
[52] U.S. Cl. ............................................. 43/34; 43/35
[58] Field of Search ...................... 43/34, 35

[56] References Cited

U.S. PATENT DOCUMENTS

| 647,076 | 4/1900 | Carpenter | 43/35 |
|---|---|---|---|
| 825,140 | 7/1906 | Lull | 43/35 |
| 1,381,003 | 6/1921 | Pierson | 43/35 |
| 1,462,949 | 7/1923 | Walls | 43/35 |
| 2,415,633 | 2/1947 | Hietala | 43/35 |
| 2,619,757 | 12/1952 | Freire | 43/35 |
| 3,483,650 | 12/1969 | Weaver | 43/35 |

FOREIGN PATENT DOCUMENTS

| 94373 | 9/1922 | Switzerland | 43/35 |
|---|---|---|---|
| 5757 | of 1895 | United Kingdom | 43/35 |

Primary Examiner—Nicholas P. Godici
Assistant Examiner—Carmine Cuda
Attorney, Agent, or Firm—Dykema Gossett

[57] ABSTRACT

A self-setting fish hook is disclosed that is automatically set in the fish by contact with the fish, the setting of the hook requiring no action from the fisherman. The hook comprises a latch assembly that latches the fish hook into a first bent position. The bending of the fish hook into this first position causes a stress in a spring member that tends to bias the fish hook back towards its unbent position. The latch is easily releasable so that upon a slight mouthing by the fish the hook will become unlatched, and the spring bias will cause the hook to set in the fish.

3 Claims, 1 Drawing Sheet

SURE SET HOOK

BACKGROUND OF THE INVENTION

The present invention, in general, relates to fish hooks in which the hook is mounted in such a way that the hook will set itself in the fish's mouth upon the slightest nibble from a fish. In addition, the fish hook of the present invention is constructed to keep the hook from becoming snagged in vegetation in the water.

It is important to continuously monitor the fishing line while fishing. When a fish bites the bait, the angler must be prepared to set the hook. In general, if the fish swallows the bait, this is not a problem since the angler will feel a tug on the line and knows that the hook is set. Problems arise, however, since the angler may not feel a tug from the fish on the line. This can happen if the line is tangled at the end of the fishing pole or if the angler has stepped away from his rod. This may happen in surf fishing where a rod is inserted in a rod holster, for instance. If the line is tangled at the tip of the fishing line, a slight tug will not be transmitted to the angler, and he will not know to set the hook. In addition, a fish often may lightly bite the bait but not actually have enough of the bait in his mouth to be captured if the hook were set by the angler. The fish may be merely mouthing the bait and move away from the bait when the angler attempts to set the hook.

Another problem encountered during fishing is the fact that the hook will often snag upon vegetation. When this happens, the hook is sometimes lost because it cannot be unhooked from the vegetation.

In the past, the prior art has attempted to create a hook that is weed-proof by putting various members in front of the hook's barb in order to prevent the barb from snagging in the vegetation. This has been done in a variety of ways. However, the prior art does not show a fishing hook that is constructed so as to set itself in the fish's mouth upon the slightest touch from a fish. The present invention discloses a self-setting hook that also achieves the feature of helping to prevent the hook from

SUMMARY OF THE INVENTION

The present invention discloses a sure set hook that will be set by contact with a fish's mouth. The hook sets itself with no action from the angler. Thus, if the fishing line is tangled; if the angler has walked away from the pole; or if the fish merely mouths the bait, the hook will still set itself, and the ganler will be able to catch the fish. In addition, the invention discloses a fish hook that is relatively weed-free.

It is an additional object of the present invention to achieve the above goals with a fish hook that comprises relatively few parts, is sturdy, and is relatively inexpensive.

The present invention achieves these results by providing a spring member that allows the hook to be bent backwards along its main shank and retained by a latching member. The latching member retains the hook in its bent-back position but it is released upon nominal mouthing by a fish.

A first embodiment of the invention utilizes a hook and coil spring that are retained by a retainer bar. A second embodiment of the invention uses a spring strip to bias the hook. The sure set hook of the present invention can also be disposed in a fishing lure.

These and other objects and features of the present invention will be better understood when considered in combination with the following specifications and appended claims, together with the attached drawings.

DETAILED DESCRIPTION OF THE PREFERRED EMBODIMENTS

The present invention discloses a sure set hook assembly generally at 10 that will set itself in a fish's mouth if the fish nomially mouths the bait.

Figure 1:
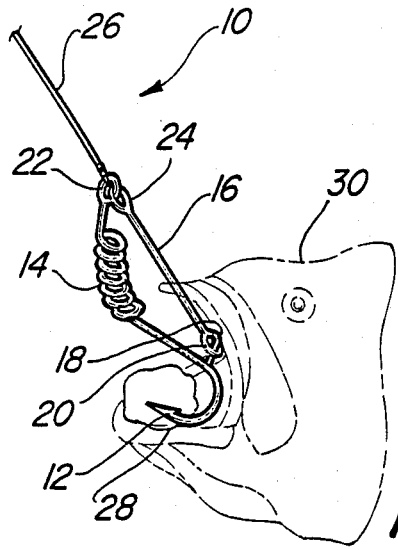
FIG. 1 is a perspective view showing a first embodiment of the invention in its latched position with a fish about to mouth the bait.

The sure set hook assembly of the present invention comprises a barbed hook member 12 that is connected to a coil spring member 14. The hook and spring combination have an eyelet member 22 formed at one end, and the fishing line 26 is attached to the eyelet 22. The portion of the hook from the eyelet 22 extending axially to the point where the barb hook 12 begins to bend laterally is known as the shank. The shank includes the eyelet 22 and the spring 14. A hook latch member 18 is formed perpendicularlly from the hook shank and extends away from the shank in the opposite direction that said hook extends. The extend of the latch 18 removed from the shank portion is turned slightly upwardly. The latch member has a slightly upturned hooked end. A one-piece retainer bar 16 has a eyelet 24 that is attached to the eyelet 22 and a latch eyelet 20 that will hook on the latch member 18. The connection between the latch member 18 and the latch eyelet 20 is such that the hook must be bent in the direction that the latch member extends in order for the retainer bar 16 to be of sufficient length that the eyelet 20 can hook on the latch member 18. When the hook is bent back into this position, there is a stress in the coil spring 14 that causes a force to bias the hook member counterclockwise as seen in FIG. 1. The hook, the shank, the spring, the latch member and the eyelet are a one-piece item.

Figure 2:
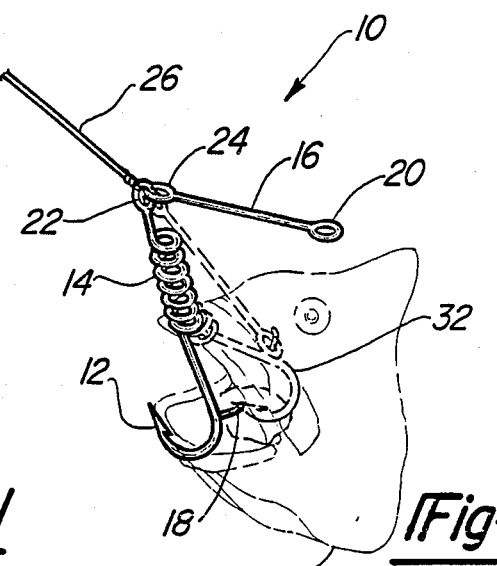
FIG. 2 is a perspective view of the first embodiment of the invention showing the hook in its unlatched position after having been set automatically in the fish's mouth.

The connection between the eyelet 20 and the latch member 18 is such that they will become unlatched upon a nominal mouthing from the fish 30 as it attempts to get the bait 28. FIG. 2 shows the sure set hook assembly 10 of the present invention after a fish has mouthed the bait and the retainer 16 has unlatched from the latch member 18. As seen in FIG. 2, barb hook 12 is now hooked in the fish's mouth, and the retainer bar 16 is now free. The original, latched position of the sure set hook 10 is shown by phantom line 32.

When the hook 12 is bent back, the spring member 14 tends to act as a weed guard that will move vegetation aside so that the hook will not snag.

Figure 3:
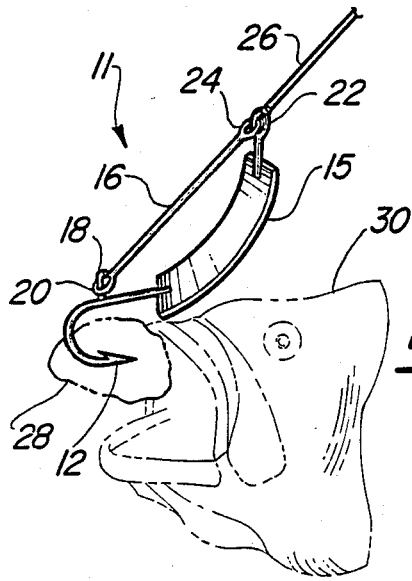
FIG. 3 is a perspective view of a second embodiment of the invention similar to the view shown in FIG. 1.

As shown in FIG. 3, a second embodiment of the sure set hook assembly 11 has many similar parts to the first embodiment. Parts that remain identical to the first embodiment retain the same number. The principal difference in the second embodiment is that a spring strip 15 is used in order to apply the bias to the hook member. The spring strip 15 has a width that is significantly greater than the width of the hook.

Figure 4:
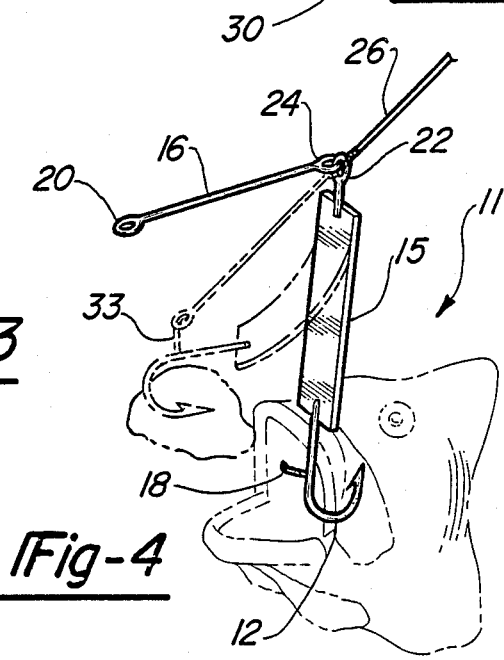
FIG. 4 is a perspective view of the second embodiment of the invention similar to the view shown in FIG. 2.

As shown in FIG. 4, the spring strip will also act to set the hook upon nominal mouthing by the fish on the bait 28. The original, latched position of the sure set hook 11 is shown by phantom line 33.

Figure 5:
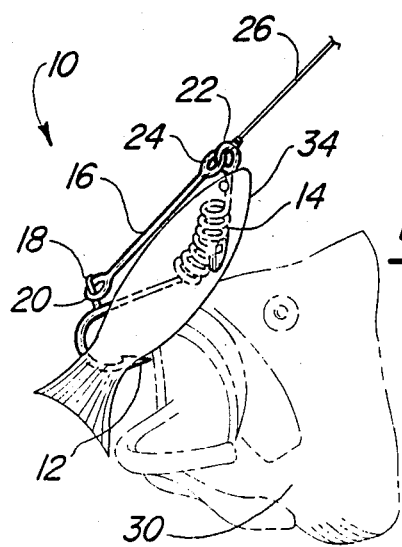
FIG. 5 is similar to FIG. 1 and shows a first embodiment of the invention disposed in a fishing lure.

FIG. 5 illustrates the first embodiment of the sure set hook 10 within a plastic fishing lure. A worker in the art will realize that slots or openings will be necessary to allow the hook to flex inside the plastic lure. All the members of the sure set hook are the same as in the first embodiment and are identified by the same numerals. The difference in FIG. 5 is that the hook is embedded in the plastic fishing lure 34.

Figure 6:
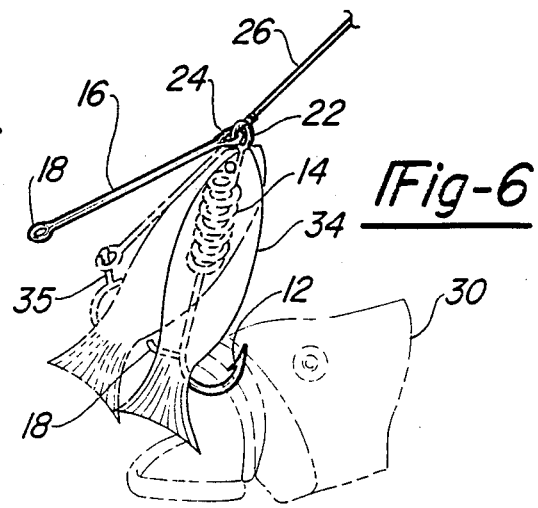
FIG. 6 is similar to FIG. 2 and shows a first embodiment of the invention disposed in the fishing lure, but in its set position.

As shown in FIG. 6, when the fish first mouths the plastic lure shown in FIG. 5, the sure set hook will release, set itself, and the hook will be embedded in the fish's mouth. The original latched position can be seen in phantom lines at 35 in FIG. 6.

A working embodiment of a sure set hook has been disclosed by the present specification. However, various modifications can be envisioned as being within the scope of the present invention. For instance, alternative type springs could be used, other type hooks could be used, or other easily tripped latching members could be used. The scope of the present invention can be better understood by consideration of the appended claims.

I claim:

1. A fish hook that is self-setting, comprising:
a fish hook shank portion;
a barbed hook portion extending from a first axial extent of said shank portion and disposed on one lateral side of said shank portion;
a latch member disposed on the lateral side of said shank portion opposite said barbed hook portion and comprising a slightly upturned hook portion at the extent of said latch member removed from said shank;
a spring member acting as a part of said shank portion;
a latch retaining member operably disposed on said shank portion;
said latch retaining member being engageable with said latch member in a latched position to bend the first axial extent of said shank portion, and the associated barbed hook portion, towards said opposite lateral side of said shank portion;
the bending of said shank causing a stress in said spring member that creates a biasing force tending to bias said shank and said barbed hook back to an unlatched position;
said fish hook shank portion comprises an eyelet portion at a second axial extent;
said barbed hook portion, said latch member, said spring member and said hook shank portion eyelet being formed as one piece;
said eyelet portion being adapted so as to receive a fishing line;
said latch retaining member being connected to said eyelet portion of said shank portion, said latch retaining member comprising a first eyelet at a first axial extent, a second eyelet at the opposite axial extent, an elongate portion integrally interconnecting said first and said second eyelets, said first eyelet being secured into said eyelet portion of said shank, said second eyelet being engageable with said latch member; and
said spring member is a coil spring.

2. A fish hook that is self-setting, comprising:
a fish hook shank portion;
a barbed hook portion extending from a first axial extent of said shank portion and disposed on one lateral side of said shank portion;
a latch member disposed on the lateral side of said shank portion opposite said barbed hook portion and comprising a slightly upturned hook portion at the extent of said latch member removed from said shank;
a spring member acting as a part of said shank portion;
a latch retaining member operably disposed on said shank portion;
said latch retaining member being engagable with said latch member in a latched position to bend the first axial extent of said shank portion, and the associated barbed hook portion, towards said opposite lateral side of said shank portion;
the bending of said shank causing a stress in said spring member that creates a biasing force tending to bias said shank and said barbed hook back to an unlatched position;
said fish hook shank portion comprises an eyelet portion at a second axial extent;
said barbed hook portion, said latch member, said spring member and said hook shank portion eyelet being formed as one piece;
said eyelet portion being adapted so as to receive a fishing line;
said latch retaining member being connected to said eyelet portion of said shank portion, said latch retaining member comprising a first eyelet at a first axial extent, a second eyelet at the opposite axial extent, an elongate portion integrally interconnecting said first and said second eyelets, said first eyelet being secured into said eyelet portion of said shank, said second eyelet being engagable with said latch member; and
said spring member is a spring strip having a greater width than said shank and disposed between said shank eyelet and said shank hook.

3. A fish hook that is self-setting as recited in claim 2, and further wherein said fish hook is disposed with an artificial lure.

* * * * *